(12) United States Patent
Nakamoto et al.

(10) Patent No.: US 10,843,741 B2
(45) Date of Patent: Nov. 24, 2020

(54) VEHICLE PANEL STRUCTURE

(71) Applicant: Toyota Jidosha Kabushiki Kaisha, Toyota (JP)

(72) Inventors: Yoshiaki Nakamoto, Nisshin (JP); Naohiko Ueno, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 71 days.

(21) Appl. No.: 16/196,753

(22) Filed: Nov. 20, 2018

(65) Prior Publication Data
US 2019/0168823 A1    Jun. 6, 2019

(30) Foreign Application Priority Data
Dec. 4, 2017    (JP) .................................. 2017-232838

(51) Int. Cl.
| | |
|---|---|
| *B62D 27/02* | (2006.01) |
| *B62D 25/02* | (2006.01) |
| *B62D 25/04* | (2006.01) |
| *B62D 25/06* | (2006.01) |

(52) U.S. Cl.
CPC ......... *B62D 27/023* (2013.01); *B62D 25/025* (2013.01); *B62D 25/04* (2013.01); *B62D 25/06* (2013.01); *B62D 27/02* (2013.01)

(58) Field of Classification Search
CPC .... B62D 27/023; B62D 27/02; B62D 25/025; B62D 25/04; B62D 25/06

USPC ..................................................... 296/193.06
See application file for complete search history.

(56) References Cited

U.S. PATENT DOCUMENTS

| | | | | |
|---|---|---|---|---|
| 5,800,008 | A * | 9/1998 | Gondo ..................... | B60R 21/04 280/751 |
| 6,397,553 | B1 * | 6/2002 | Horikawa ............... | B60R 21/04 296/187.05 |
| 7,900,997 | B2 * | 3/2011 | Hosaka ................... | B62D 25/07 296/193.12 |
| 9,126,632 | B2 * | 9/2015 | Ono ......................... | B62D 25/06 |
| 2018/0015957 | A1 * | 1/2018 | Kishima ............... | B62D 29/002 |

FOREIGN PATENT DOCUMENTS

JP    2004-306884 A    11/2004

* cited by examiner

*Primary Examiner* — Pinel E Romain
(74) *Attorney, Agent, or Firm* — Dinsmore & Shohl LLP (57) ABSTRACT

A vehicle panel stricture includes an outer panel, a side member outer panel disposed outward of the outer panel in a vehicle width direction, an inner panel disposed inward of the outer panel in the vehicle width direction, and a first welded portion formed through spot welding in a state where the inner panel, the side member outer panel, and the outer panel are laid over each other while being arranged in this order from an outside of a vehicle or in a state where the side member outer panel, the outer panel, and the inner panel are laid over each other while being arranged in this order from the outside of the vehicle. In the vehicle panel structure, the outer panel is provided with a ridge portion and the thickness of the outer panel at the first welded portion is smaller than the thickness of the ridge portion.

4 Claims, 8 Drawing Sheets

VEHICLE PANEL STRUCTURE

CROSS-REFERENCE TO RELATED APPLICATIONS

This application claims priority to Japanese Patent Application No. 2017-232838 filed on Dec. 4, 2017, which is incorporated herein by reference in its entirety including the specification, drawings and abstract.

BACKGROUND

1. Technical Field

The disclosure relates to a vehicle panel structure.

2. Description of Related Art

Japanese Unexamined Patent Application Publication No. 2004-306884 (JP 2004-306884 A) discloses a vehicle panel structure provided with a welded portion that is formed through spot welding performed in a state where a roof panel, a side member outer panel, an outer panel (rail outer panel), and an inner panel (rail inner panel) are laid over each other while being arranged in this order from the outside of a vehicle.

SUMMARY

In a case where the thickness of an outermost panel (roof panel) in the vehicle panel structure in JP 2004-306884 A is made small, a thickness ratio of the total thickness of all of the panels to the thickness of the outermost panel (total thickness of all of panels/thickness of outermost panel) at the welded portion becomes large. In addition, in the case of spot welding, a nugget is formed at the center of all of the panels in a thickness direction. Therefore, when the above-described thickness ratio is large, the nugget of spot welding may not be formed on the outermost panel and welding failure may occur.

Meanwhile, when the above-described thickness ratio is made small by reducing the total thickness of all the panels with the thickness of the outer panel made small in order to suppress welding failure, the yield strength it vehicle collision (frontal collision or side collision) of the outer panel decreases.

The disclosure provides a vehicle panel structure with which it is possible to maintain the yield strength against vehicle collision of an outer panel while suppressing welding failure even in a case where the thickness of an outermost panel is made small.

An aspect of the disclosure relates to a vehicle panel structure that includes an outer panel, a side member outer panel, an inner panel, and a first welded portion. The outer panel constitutes an outer plate of a roof side rail or an outer plate of a front pillar. The side member outer and is disposed outward of the outer panel in a vehicle width direction. The inner panel is disposed inward of the outer panel, in the vehicle width direction. The first welded portion is formed through spot welding that is performed on three or more panels including the inner panel, the side member outer panel, and the outer panel in a state where the inner panel, the side member outer panel, and the outer panel are laid over each other while being arranged in this order from the outside of a vehicle or in a state where the side member outer panel, the outer panel, and the inner panel are laid over each other while being arranged in this order from the outside of the vehicle. The outer panel is provided with a ridge portion that is disposed outward of the first welded portion in the vehicle width direction and that protrudes toward the outside of the vehicle and the thickness of the outer panel at the first welded portion is smaller than the thickness of the ridge portion.

In the case of the vehicle panel structure according to the aspect of the disclosure, the first welded portion is formed through the spot welding that is performed on three or more panels including the inner panel, the member outer panel, and the outer panel in a state where the inner panel, the side member outer panel, and the outer panel are laid over each other while being arranged in this order from the outside of the vehicle or in a state where the side member outer panel, the outer panel, and the inner panel are laid over each other while being arranged in this order from the outside of the vehicle.

Therefore, any one of the inner panel, the side member outer panel, and another panel (panel other than inner panel, side member outer panel, and outer panel) constitutes an outermost panel of the first welded portion. Furthermore, the three or more panels including the inner panel, the side member outer panel, and the outer panel constitute all of the panels of the first welded portion.

The outer panel is provided with the ridge portion that is disposed outward of the first welded portion in the vehicle width direction and that protrudes toward the outside of the vehicle and the thickness of the outer panel at the first welded portion is smaller than the thickness of the ridge portion.

Accordingly, the total thickness of all of the panels of the first welded portion can be made small in comparison with a case where the thickness of the entire outer panel including the first welded portion is made large to be equal to the thickness of the ridge portion of the outer panel (first comparative example).

Accordingly, in the case of the vehicle panel structure according to the aspect of the disclosure, it is possible to maintain a thickness ratio of the total thickness of all of the panels to the thickness of the outermost panel of the first welded portion at a low ratio in comparison with the first comparative example. Therefore, it is possible to suppress welding failure even in a case where the thickness or the outermost panel is made small.

In the case of the vehicle panel structure according to the aspect of the disclosure, the thickness of the ridge portion that protrudes toward the outside of the vehicle is large in comparison with a case where the thickness of the entire outer panel including the ridge portion is made small to be equal to the thickness of the outer panel at the welded portion (second comparative example). Therefore, in the case of the vehicle panel structure according, to the aspect of the disclosure, the ridge portion is not likely to be deformed due to input from the outside of the vehicle at the time of vehicle collision and it is possible to maintain the yield strength against vehicle collision of the outer panel comparison with the second comparative example.

Therefore, with the vehicle panel structure according to the aspect, of the disclosure, it s possible to maintain the yield strength against vehicle collision of the outer panel while suppressing welding failure even in a case where the thickness of the outermost panel is made small.

In the vehicle panel structure according to the aspect of the disclosure, the thickness of the outer panel may gradually decrease toward the first welded portion from the ridge portion.

Here, in a case where the thickness of the outer panel dramatically changes between the ridge portion and the first welded portion (third comparative example), a stress is concentrated on the portion where the thickness changes at the time of vehicle collision. In contrast, in the case of the vehicle panel structure according to the aspect of the disclosure, the thickness of the outer panel gradually decreases toward the first welded portion from the ridge portion. Therefore, it is possible to suppress the stress concentrated on a portion of the outer panel at the time of vehicle collision in comparison with the third comparative example.

The vehicle panel structure according to the aspect of the disclosure may further include a second welded portion. The second welded portion may be formed through welding that is performed on the outer panel and a rail inner panel of the roof side rail in a state where the rail inner panel is laid over a lower surface of the outer panel, the lower surface being positioned outward of the first welded portion in the vehicle width direction.

In the vehicle panel structure according to the aspect of the disclosure, a rail inner panel of the roof side rail may be welded at the first welded portion.

According to the aspect of the disclosure, it is possible to maintain the yield strength against vehicle collision of the outer panel while suppressing welding failure even in a case where the thickness of the outermost panel is made small.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an example of an embodiment of the disclosure will be described based on the drawings. An arrow FR, an arrow UP, and an arrow IN appropriately illustrated in each drawing respectively represent a vehicle front side, a vehicle upper side, and an inner side in a vehicle width direction. The vehicle width direction is a direction parallel to a right-left direction of a vehicle and a direction from the center in the vehicle width direction to any of opposite end sides will be referred to as a direction toward an outer side in the vehicle width direction and a direction that is opposite to the direction toward the outer side in the vehicle width direction will be referred to as a direction toward the inner side in the vehicle width direction. Hereinafter, front, rear, right, left, upper, and lower sides of the vehicle may be simply referred to as front, rear, right, left, upper, and lower sides. An end portion of each component that is on the outer side in the vehicle width direction may be referred to as an outer end portion and an end portion of each component that is on the inner side in the vehicle width direction may be referred to as an inner end portion.

Vehicle Panel Structure 10

A vehicle panel structure 10 according to the embodiment will be described.

Figure 1:
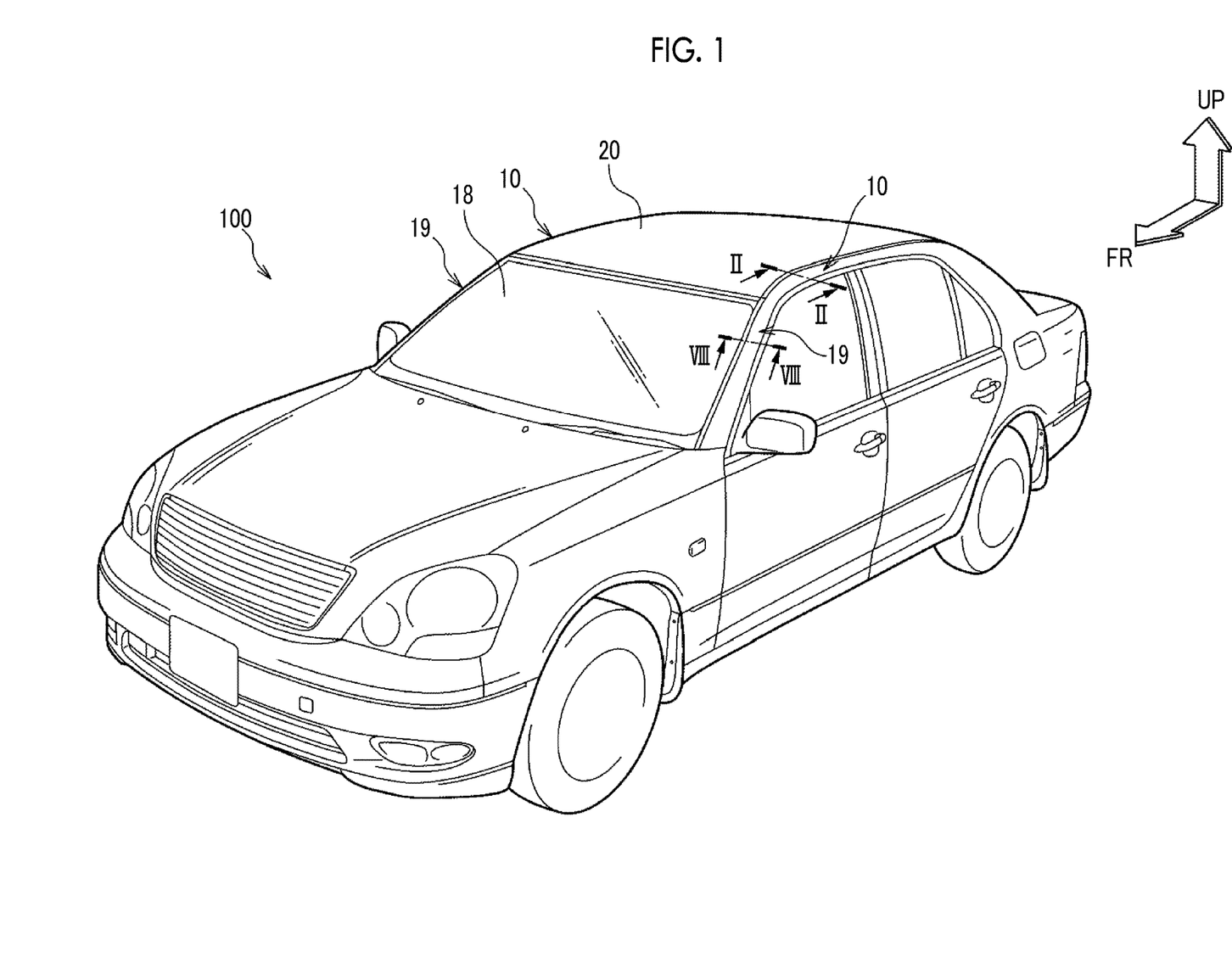
FIG. 1 is a perspective view illustrating a vehicle to which a vehicle panel structure according to an embodiment is applied.
Figure 2:
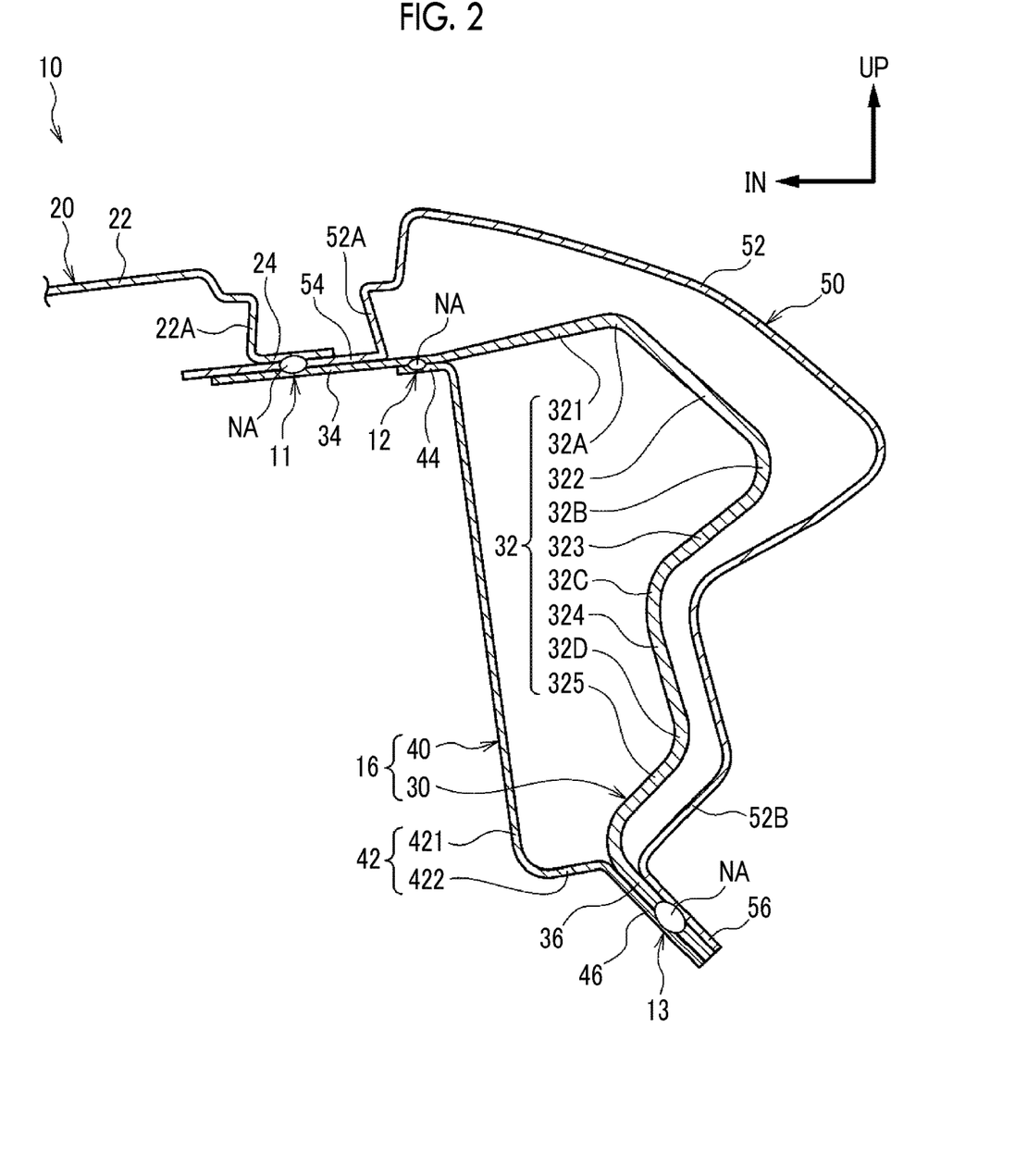
FIG. 2 is a front sectional view illustrating the vehicle panel structure according to the embodiment (sectional view taken along line II-II in FIG. 1)

FIG. 1 is a perspective view illustrating a vehicle 100 to which the vehicle panel structure 10 is applied. FIG. 2 is a front sectional view illustrating the vehicle panel structure 10 (sectional view taken along line II-II in FIG. 1).

As illustrated in FIG. 1, the vehicle panel structure 10 is applied to each of right and left sides of a roof panel 20 of the vehicle 100 such as an automobile. The vehicle panel structure 10 applied to the right side of the roof panel 20 and the vehicle panel structure 10 applied to the left side of the roof panel 20 have the same configuration as each other except that one of those has a shape in which the right and left sides are reversed. Therefore, hereinafter, the vehicle panel structure 10 applied to the left side the roof panel 20 will be described.

As illustrated in FIG. 2, the vehicle panel structure 10 is provided with the roof panel 20 (example of inner panel), a rail outer panel 30 (example of outer panel), a rail inner panel 40, a side member outer panel 50, a first welded portion 11 (example of welded portion), a second welded portion 12, and a third welded portion 13.

The roof panel 20 is a panel constituting a roof portion of the vehicle 100 and is formed with metal such as a steel plate. The sectional shape of the roof panel 20 as seen in a front sectional view (sectional view taken along line II-II in FIG. 1) is an approximately hat-like shape that is open to a vehicle lower side. In FIG. 2, a portion of the left side of the roof panel 20 is shown.

Specifically, the roof panel 20 is provided with a main body portion 22 and a flange portion 24. The main body portion 22 is formed into an approximately rectangular shape as seen in a plan view and a vertical wall 22A that extends in the vertical direction is provided for each of opposite end portions of the main body portion 22 in the vehicle width direction. The flange portion 24 projects outward in the vehicle width direction from a lower end portion of the vertical wall 22A.

The rail outer panel 30 constitutes an outer plate of a roof side rail 16 that extends in a vehicle front-rear direction while being positioned outward of the roof panel 20 in the vehicle width direction. The rail outer panel 30 is formed with metal such as a steel plate. Specifically, the rail outer panel 30 is formed with a high-strength steel plate such as a high-tensile-strength material or hot stamping material.

The rail outer panel 30 is disposed outward of the roof panel 20 in the vehicle width direction. In other words, the roof panel 20 is disposed inward of the rail outer panel 30 in the vehicle width direction.

Specifically, the rail outer panel 30 is provided with a main body portion 32 and flange portions 34, 36. The main body portion 32 is provided with a first wall portion 321, a second wall portion 322, a third wall portion 323, a fourth wall portion 324, and a fifth wall portion 325.

The first wall portion 321 is inclined to extend upward and outward in the vehicle width direction as seen in the front sectional view. The second wall portion 322 is inclined to extend downward and outward in the vehicle width direction from an outer end portion of the first wall portion 321 as seen in the front sectional view. The third wall portion 323 is inclined to extend downward and inward in the vehicle width direction from an outer end portion (lower end portion) of the second will portion 322 as seen in the tout sectional view. The fourth wall portion 324 is inclined to extend downward and outward in the vehicle width direction from an inner end portion (lower end portion) of the third wall portion 323 as seen in the front sectional view. The fifth all portion 325 is inclined to extend downward and inward in the vehicle width direction from an outer end portion (lower end portion) of the fourth wall portion 324 as seen in the front sectional view.

The main body portion 32 is formed with a ridge portion 32A that protrudes toward the outside of the vehicle (toward vehicle upper side) between the first will portion 321 and the second wall portion 322. A ridge portion 32B that protrudes toward the outside of the vehicle (toward outer side in vehicle width direction) is formed between the second wall portion 322 and the third wall portion 323. A ridge portion 32C that protrudes toward the inside of the vehicle (toward inner side in vehicle width direction) is formed between the third wall portion 323 and the fourth wall portion 324. A ridge portion 32D that protrudes toward the outside of the vehicle (toward outer side in vehicle width direction) is formed between the fourth wall portion 324 and the fifth wall portion 325.

The ridge portion 32A is a ridge portion that is provided closest to the flange portion 34 from among a plurality of the ridge portions protruding to the outside of the vehicle.

The flange portion 34 projects inward in the vehicle width direction from an inner end portion of the first wall portion 321 of the main body portion 32 as seen in the front sectional view. The flange portion 36 projects being inclined to extend downward and outward in the vehicle width direction from an inner end portion of the fifth wall portion 325 of the main body portion 32 as seen in the front sectional view.

The rail inner panel 40 constitutes an inner plate of the roof side rail 16. The rail inner panel 40 is disposed inward of the rail outer panel 30 in the vehicle width direction. The rail inner panel 40 is formed with metal such as a steel plate. Specifically, the rail inner panel 40 is provided with a main body portion 42 and flange portions 44, 46.

The main body portion 42 is formed in an L-shape as seen in the front sectional view. Specifically, the main body portion 42 is provided with a first wall portion 421 that extends in the vertical direction and a second wall portion 422 that extends outward in the vehicle width direction from a lower end portion of the first wall portion 421 as seen in the front sectional view.

The flange portion 44 projects inward in the vehicle width direction from an upper end portion of the first wall portion 421 of the main body portion 42. The flange portion 46 projects being inclined to extend downward and outward in the vehicle width direction from an outer end portion of the second wall portion 422 of the main body portion 42. When the flange portions 44, 46 are welded to the flange portions 34, 36 of the rail outer panel 30, the rail inner panel 40 and the rail outer panel 30 constitute the roof side rail 16 having a closed section structure.

The side member outer panel 50 is disposed outward of the rail outer panel 30 in the vehicle width direction. The side member outer panel 50 extends in the vehicle front rear direction along the roof side rail 16 and is formed with metal such as a steel plate. The sectional shape of the side member outer panel 50 as seen in the front sectional view is an approximately hat-like shape that is open to a lower side and the inner side in the vehicle width direction. Specifically, the side member outer panel 50 is provided with a main body portion 52 and flange portions 54, 56.

An inner end portion of the main body portion 52 is provided with a vertical wall 52A that extends in the vertical direction and an outer end portion of the main body portion 52 is provided with an inclined wall 52B that is inclined to extend downward and inward in the vehicle width direction. The flange portion 54 projects inward in the vehicle width direction from a lower end portion of the vertical wall 52A. The flange portion 56 projects being inclined to extend downward and outward in the vehicle width direction from a lower end portion of the inclined wall 52B.

The first welded portion 11 is formed through spot welding that is performed on the three panels, which are the flange portions 24, 54, 34, in a state were the flange portion 24 of the roof panel 20, the flange portion 54 of the side member outer panel 50, and the flange portion 34 of the rail outer panel 30 are laid over each other white being arranged in this order from the outside of the vehicle (from vehicle upper side).

In the spot welding, an electric current is caused to flow to the panels laid over each other and the panels are bonded to each other with metal molten due to electrical resistance heat. A portion molten and coagulated due to the spot welding is called a nugget. The first welded portion 11 is formed with a nugget NA.

The second welded portion 12 is formed through welding that is performed the flange portions 34, 44 in a state where the flange portion 44 of the rail inner panel 40 is laid over a lower surface of the flange portion 34 of the rail outer panel 30, the lower surface being positioned outward of the first welded portion 11 in the vehicle width direction. As a welding method, for example, spot welding is used. However, other welding methods may also be used.

The third welded portion 13 is formed through welding that is performed the flange portions 56, 36, 46 in a state where the flange portion 56 of the side member outer panel 50, the flange portion 36 of the rail outer panel 30, and the flange portion 46 of the rail inner panel 40 are laid over each other while being arranged in this order from the outside of the vehicle (outer side in vehicle width direction). As a welding method, to example, spot welding is used. However, other welding methods may also be used.

The thickness of the rail outer panel 30 at the first welded portion 11 (that is, thickness of flange portion 34) is smaller than the thickness of the ridge portion 32A. The thickness of the rail outer panel 30 gradually decreases toward the first welded portion 11 (flange portion 34) from the ridge portion 32A. That is, the thickness of the first wall portion 321 gradually (continuously) decreases toward the inner side in the vehicle width direction from the outer side in the vehicle width direction.

The thickness of a portion of the rail outer panel 30 over an area from the ridge portion 32A to the flange portion 36 (including flange portion 36) is the same as the thickness of the ridge portion 32A and is constant. The thickness of the flange portion 34 is also constant. Therefore, the thickness of the flange portion 34 is smaller than the thickness of the ridge portions 32A, 32B, 32C, 32D.

The thickness of each of the roof panel 20, the rail inner panel 40, and the side member outer panel 30 is constant over the entire portion. The thickness of the roof panel 20 is smaller than the thickness of any of the side member outer panel 50, the rail inner panel 40, and the flange portion 34 of the rail outer panel 30. The thickness of the side member outer panel 50 is smaller than the thickness of any of the rail inner panel 40 and the flange portion 34 of the rail outer panel 30. The thickness of the rail inner panel 40 is smaller than the thickness of the ridge portion 32A of the rail outer panel 30. For example, the thickness of the rail inner panel 40 is the same as that of the flange portion 34 of the rail outer panel 30.

Effect of Vehicle Panel Structure 10

Next, the effect of the vehicle panel structure 10 will be described.

In the vehicle panel structure 10, as described above, the first welded portion 11 is formed through spot welding that is performed on the three panels, which are the flange portions 24, 54, 34, in a state were the flange portion 24 of the roof panel 20, the flange portion 54 of the side member outer panel 50, and the flange portion 34 of the rail outer panel 30 are laid over each ether while being arranged in this order from the outside of the vehicle (from vehicle upper side).

Therefore, the flange portion 24 of the roof panel 20 constitutes an outermost panel of the first welded portion 11. The flange portions 24, 54, 34 constitute all of the panels of the first welded portion 11.

The thickness of the rail outer panel 30 at the first welded portion 11 (thickness of flange portion 34) is smaller than the thickness of the ridge portions 32A, 32B, 32C, 32D.

Figure 3:
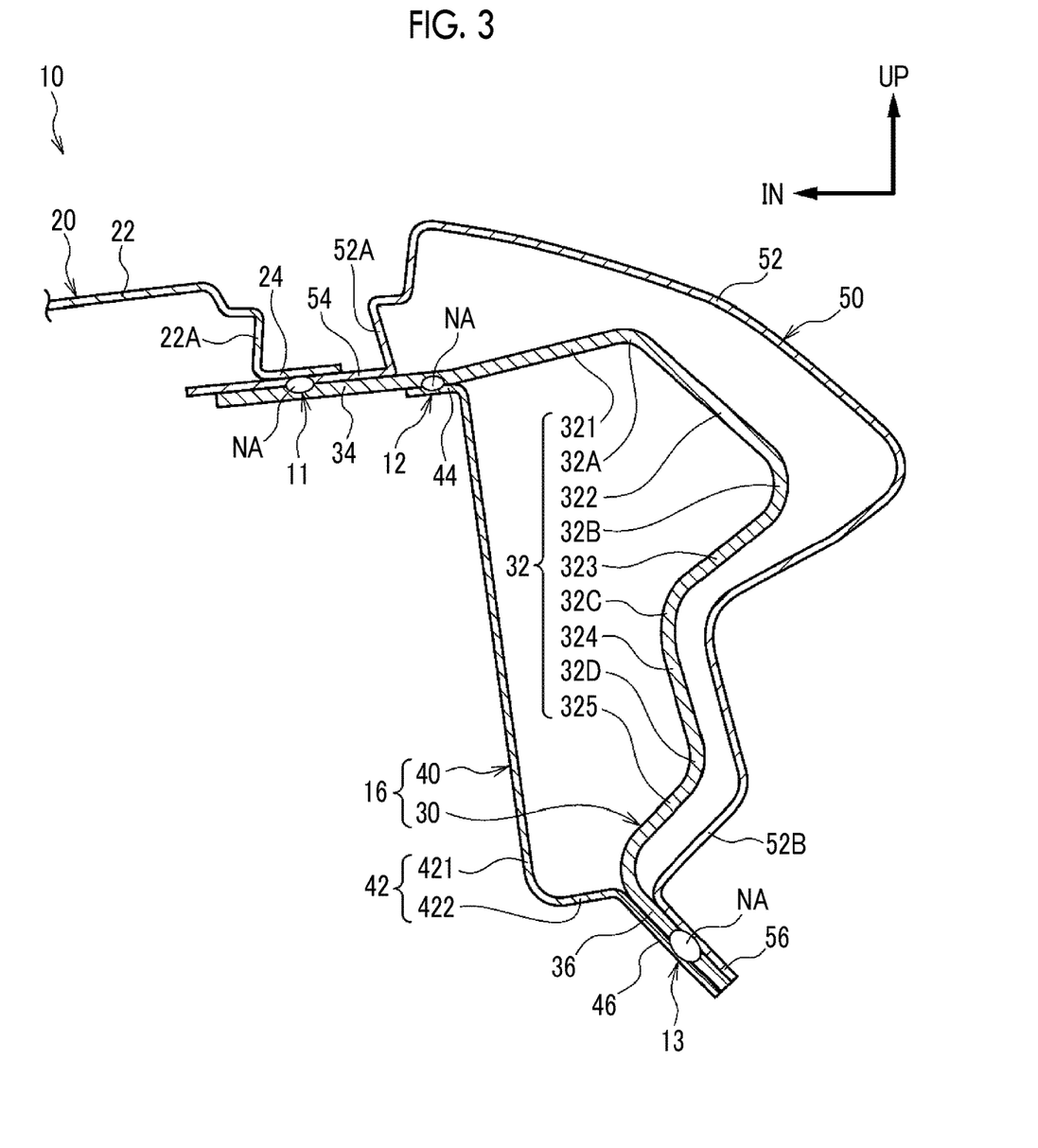
FIG. 3 is a front sectional view illustrating a vehicle panel structure according to a first comparative example.
Figure 4:
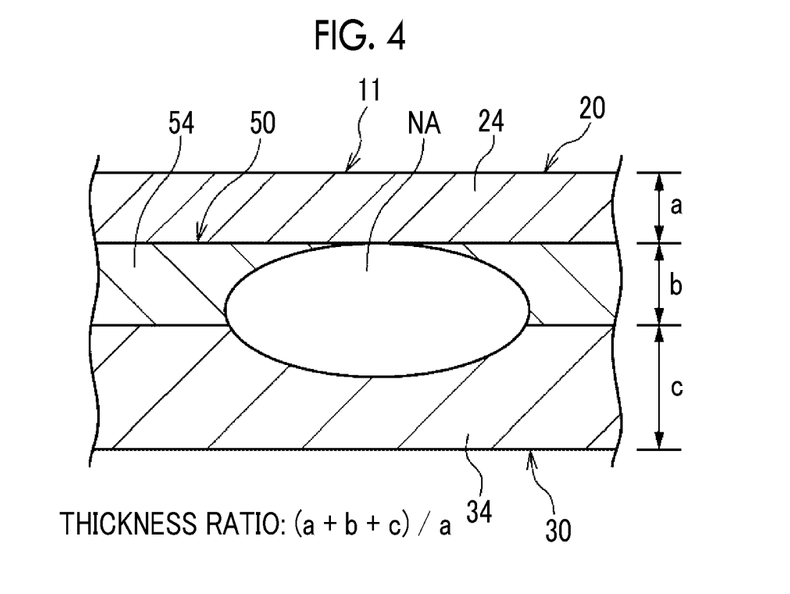
FIG. 4 is an enlarged front sectional view illustrating a first welded portion according to the embodiment.

Here in a case where the thickness of the entire rail outer panel 30 including the first welded portion 11 (flange portion 34) is made large to be equal to the thickness of the ridge portions 32A, 32B, 32C, 32D as illustrated in FIG. 3 (first comparative example), a thickness ratio [(a+b+c)/a] of the total thickness (a+b+c) of all of the panels (roof panel 20, side member outer panel 50, and rail outer panel 30) to the thickness a of the outermost panel (roof panel 20) at the first welded portion 11 becomes large when the thickness a of the outermost panel is made small (refer to FIG. 4). In addition, in the case of spot welding, the nugget NA is thrilled at the center of all of the panels in a thickness direction. Therefore, when the above-described thickness ratio is large, the nugget NA of spot welding may not be formed on the outermost panel as illustrated in FIG. 4 and welding failure may occur.

In contrast, in the case of the vehicle panel structure 10 according to the present embodiment, the thickness c of the rail outer panel 30 at the first welded portion 11 (thickness of flange portion 34) is smaller than the thickness of the ridge portions 32A, 32B, 32C, 32D. Therefore, the total thickness (a+b+c) of all of the panels of the first welded portion 11 can be made small in comparison with the first comparative example.

Accordingly, in the case of the vehicle panel structure 10 according to the present embodiment, it is possible to maintain the thickness ratio [(a+b+c)/a] of the total thickness (a+b+c) of all of the panels to the thickness a of the outermost panel of the first welded portion 11 at a low ratio in comparison with the first comparative example. Therefore, it is possible to suppress welding failure even in a case where the thickness of the outermost panel is made small.

Figure 5:
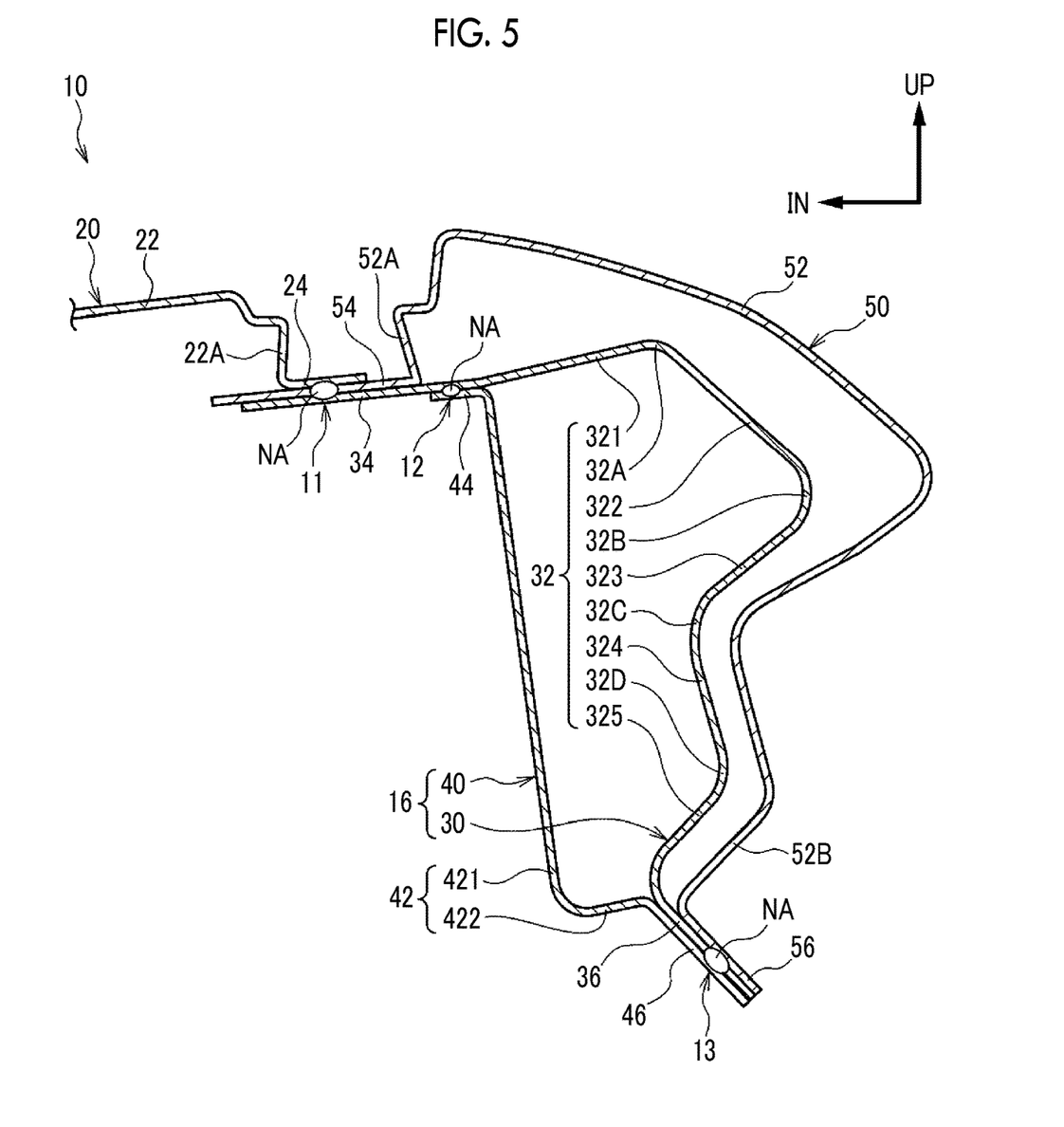
FIG. 5 is a front sectional vim illustrating a vehicle panel structure according to a second comparative example.

In a case where the thickness of the entire rail outer panel 30 including the ridge portions 32A, 32B, 32C, 32D is made small to be equal to the thickness of the rail outer panel 30 at the first welded portion 11 (flange portion 34) as illustrated in FIG. 5 (second comparative example), the ridge portions 32A, 32B, 32C, 32D become likely to be deformed due to input from the outside of the vehicle at the time of vehicle collision (frontal collision or side collision) and the yield strength against vehicle collision of the rail outer panel 30 decreases.

In the case of the vehicle panel structure 10 according to the present embodiment, the thickness of the ridge portions 32A, 32B, 32C, 32D is large in comparison with the second comparative example. Therefore, in the case of the vehicle panel structure 10 according to the present embodiment, the ridge portions 32A, 32B, 32C, 32D are not likely to be deformed due to input from the outside of the vehicle at the time of vehicle collision and it is possible to maintain the yield strength against vehicle collision of the rail outer panel 30 in comparison with the second comparative example. Particularly, since the thickness of the ridge portions 32A, 32B 32D that protrude toward the outside of the vehicle is large, the rail outer panel 30 being deformed toward the inside of the vehicle can be suppressed.

As described above, with the vehicle panel structure 10 according to the present embodiment, its is possible to maintain the yield strength against vehicle collision of the rail outer panel 30 while suppressing welding failure even in a case where the thickness of the outermost panel (roof panel 20) is made small. Since it is possible to access the roof panel 20 from a vehicle cabin side in a state where the roof panel 20 is installed on the vehicle 100, it is possible to reinforce the roof panel 20 by attaching a reinforcement material to the roof panel 20 after the roof panel 20 is installed on the vehicle 100 even in a case where the thin roof panel 20 is used.

Figure 6:
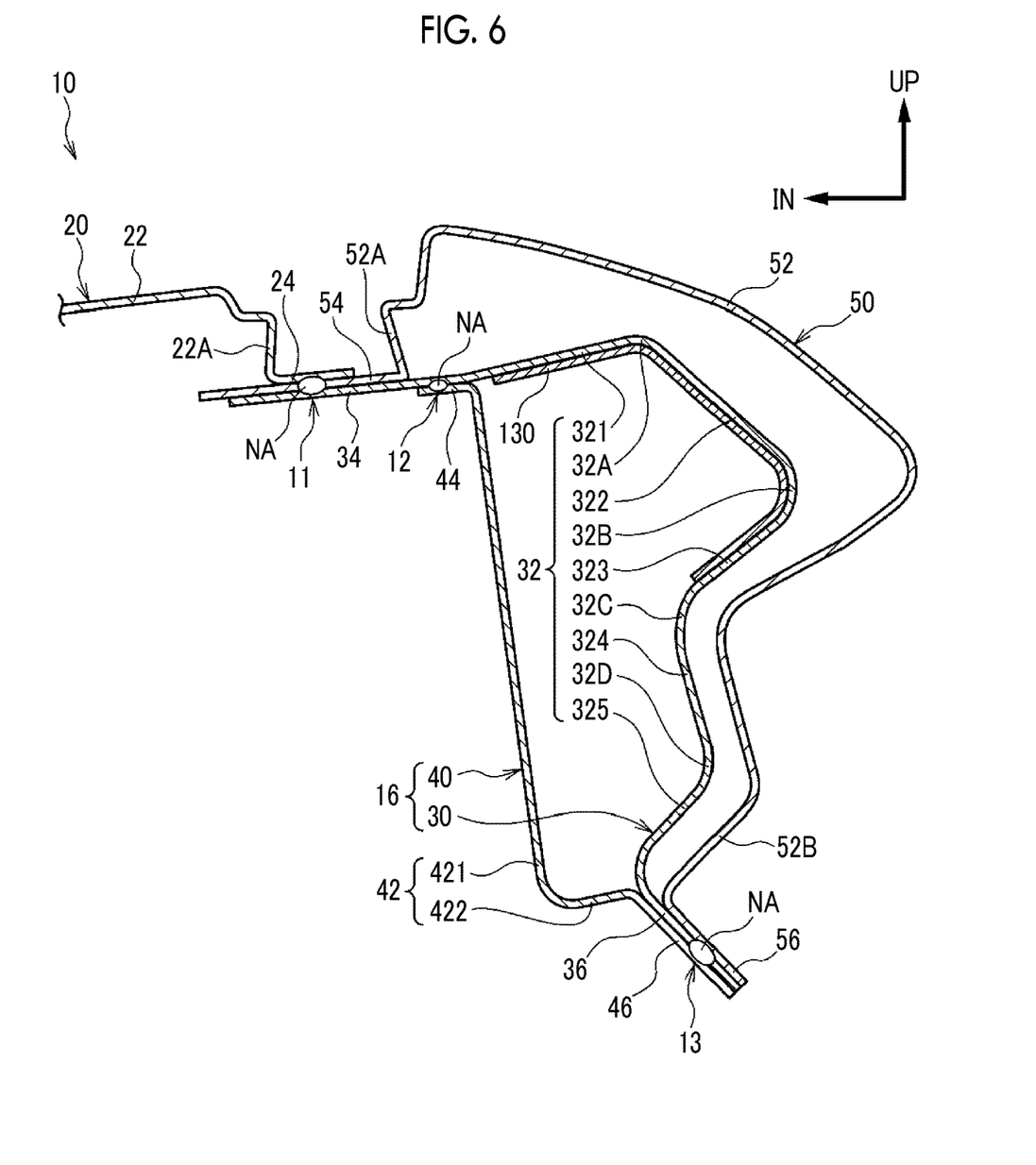
FIG. 6 is a front sectional view illustrating the vehicle panel structure according to the second comparative example provided with a reinforcement material.

It is conceivable to provide a reinforcement material 130 on the first wall portion 321, the second wall portion 322, and the third wall portion 323 as illustrated in FIG. 6 in order to improve the yield strength against vehicle collision of the rail outer panel 30 in the second comparative example illustrated in FIG. 5. In this case, the number of components is increased, which results in an increase in cost and an increase in mass of the rail outer panel 30. In contrast, in the case of the vehicle panel structure 10 according to the present embodiment, it is possible to maintain the yield strength against vehicle collision of the rail outer panel 30 without providing the reinforcement material 130. Therefore, it is possible to reduce the number of components in comparison with the configuration illustrated in FIG. 6.

In the case of the vehicle panel structure 10 according to the present embodiment, the thickness of the rail outer panel 30 gradually decreases toward the first welded portion 11 (flange portion 34) from the ridge portion 32A. In a case where the thickness of the rail outer panel 30 dramatically changes between the ridge portion 32A and the first welded portion 11 (flange portion 34) (third comparative example), a stress is concentrated on the portion where the thickness changes at the time of vehicle collision. In contrast, in the case of the vehicle panel structure 10 according to the present embodiment, the thickness of the rail outer panel 30 gradually decreases toward the first welded portion 11 (flange portion 34) from the ridge portion 32A as described above. Therefore, it is possible to suppress the stress concentrated on a portion of the rail outer panel 30 at the time of vehicle collision in comparison with the third comparative example.

Modification Example of Vehicle Panel Structure 10

Figure 7:
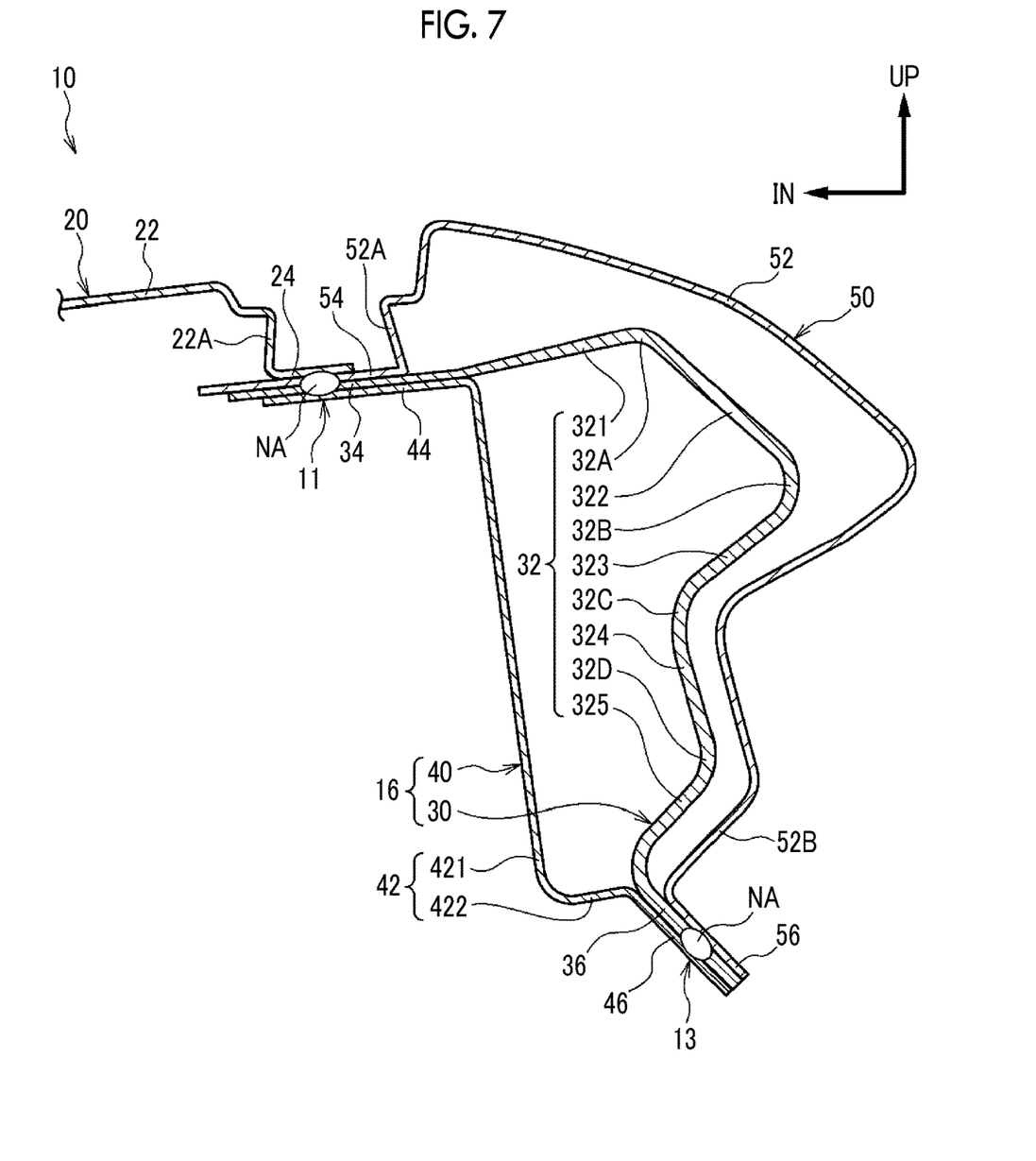
FIG. 7 is a front sectional view illustrating a vehicle panel structure according to a modification example.

As described above, the vehicle panel structure 10 includes the second welded portion 12. That is, in the vehicle panel structure 10, the flange portions 34, 44 are welded to each other in a state where the flange portion 44 of the rail inner panel 40 is laid over a lower surface of the flange portion 34 of the rail outer panel 30, the lower surface being positioned outward of the first welded portion 11 in the vehicle width direction. However, the disclosure is not limited to this. For example, as illustrated in FIG. 7, the flange portion 44 of the rail inner panel 40 may be welded at the first welded portion 11. That is, the first welded portion 11 may be formed through spot welding performed on the four panels, which are the flange portions 24, 54, 34, 44 in a state were the flange portion 24 of the roof panel 20, the flange portion 54 of the side member outer panel 50, the flange portion 34 of the rail outer panel 30, and the flange portion 44 of the rail inner panel 40 are laid over each other while being arranged in this order from the outside of the vehicle (from vehicle upper side).

As described above, the welded portion in the vehicle panel structure 10 may be a welded portion formed through spot welding performed on four or more panels. In the configuration illustrated in FIG. 7, the roof panel 20 functions as an example of the inner panel and the rail inner panel 40 functions as another panel (panel other than inner panel, side member outer panel, and outer panel). Furthermore in the configuration illustrated in FIG. 7, the rail inner panel 40 can be grasped as an example of the inner panel and the roof panel 20 can be grasped as the other panel (panel other than inner panel, side member outer panel, and outer panel).

In the vehicle panel structure 10, the thickness of the rail outer panel 30 at the first welded portion 11 (thickness of flange portion 34) is smaller than the thickness of the ridge portions 32A, 32B, 32C, 32D. However, the disclosure is not limited to this as long as the thickness of the rail outer panel 30 at the first welded portion 11 (thickness of flange portion 34) is smaller than the thickness of at least one of the ridge portions 32A, 32B, 32D protruding toward the outside of the vehicle.

In the vehicle panel structure 10, the thickness of the rail outer panel 30 gradually decreases toward the first welded portion 11 (flange portion 34) from the ridge portion 32A. However, the disclosure is not limited to this. For example, the thickness of the rail outer panel 30 may decrease toward the first welded portion 11 (flange portion 34) from the ridge portion 32A in a stepwise manner (not continuously).

Vehicle Panel Structure 19

A vehicle panel structure 19 according to the present embodiment will be described.

Figure 8:
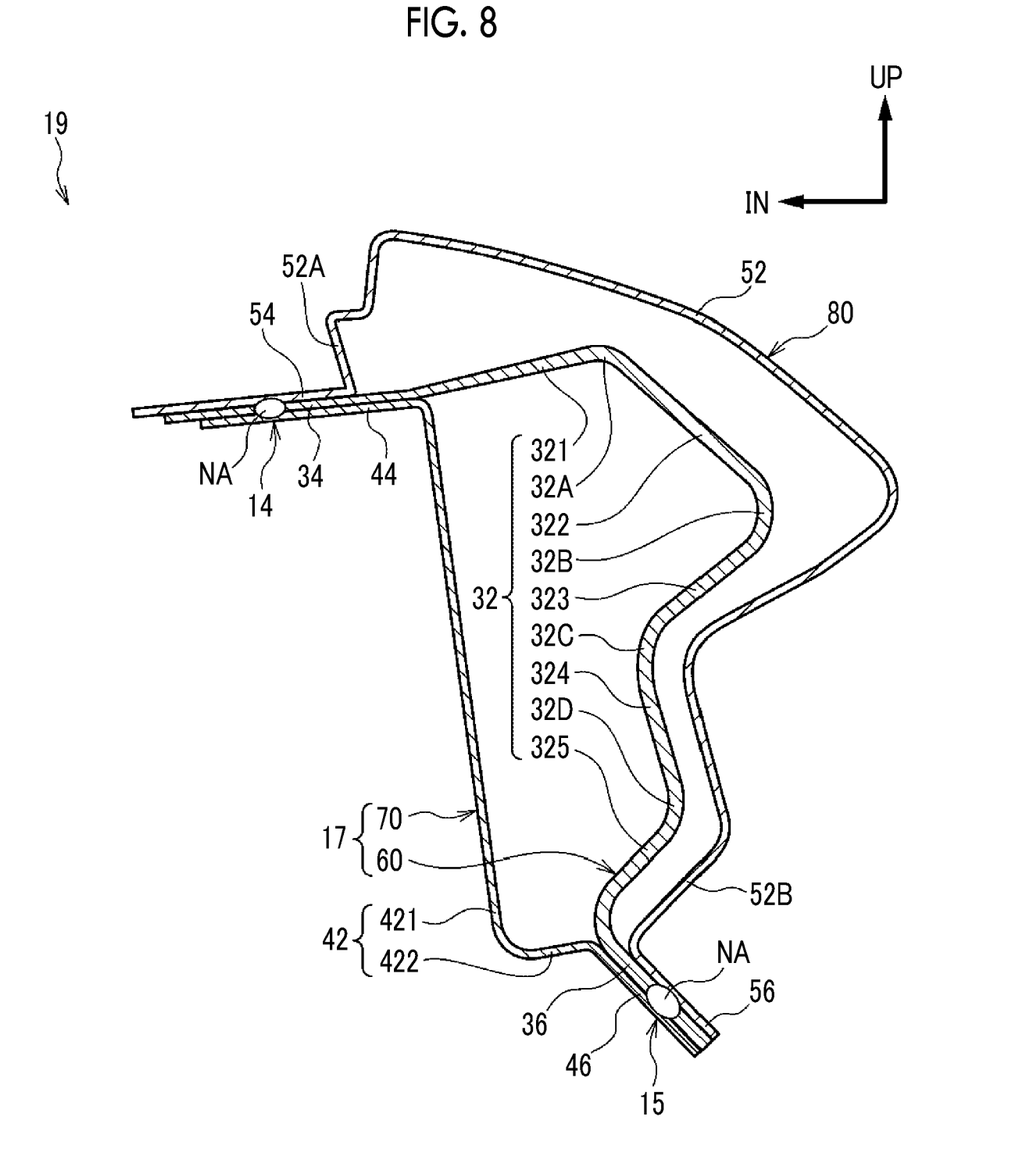
FIG. 8 is a front sectional view illustrating the vehicle panel structure according to the embodiment (sectional view taken along line in FIG. 1).

FIG. 8 is a front sectional view illustrating the vehicle panel structure 19 (sectional view taken along line VIII-VIII in FIG. 1).

As illustrated in FIG. 1, the vehicle panel structure 19 is applied to each of right and left sides (where front pillars 17 are disposed) of a front windshield glass 18 (hereinafter, referred to as "windshield 18") of the vehicle 100 such as an automobile. The vehicle panel structure 19 applied to the right side of the windshield 18 and the vehicle panel structure 19 applied to the left side of the windshield 18 have the same configuration as each other except that one of those has a shape in which the right and left sides are reversed. Therefore, hereinafter, the vehicle panel structure 19 applied to the left side of the windshield 18 will be described.

As illustrated in FIG. 8, the vehicle panel structure 19 is provided with a pillar outer panel 60 (example of outer panel), a pillar inner panel 70 (example of inner panel), a side member outer panel 80, a fourth welded portion 14 (example of welded portion), and a fifth welded portion 15.

The pillar outer panel 60 constitutes an outer plate of the front pillar 17 that extends in a vehicle height direction at a vehicle front portion. The pillar outer panel 60 is formed with metal such as a steel plate. Specifically, the pillar outer panel 60 is formed with a high-strength steel plate such as a high-tensile-strength material or a hot stamping material. The pillar outer panel 60 is disposed outward of the windshield 18 in the vehicle width direction.

Since the pillar outer panel 60 has the same configuration as that of the rail outer panel 30 of the vehicle panel structure 10, the same reference numerals as those for respective portions of the rail outer panel 30 are given to respective portions of the pillar outer panel 60 and description thereof will be appropriately omitted.

The pillar inner panel 70 constitutes an inner plate of the front pillar 17. The pillar inner panel 70 is disposed inward of the pillar outer panel 60 in the vehicle width direction. The pillar inner panel 70 is formed with metal such as a steel plate.

Since the pillar inner panel 70 has the same configuration as that of the rail inner panel 40 of the vehicle panel structure 10, the same reference numerals as those for respective portions of the rail inner panel 40 are given to respective portions of the pillar inner panel 70 and description thereof will be appropriately omitted. When the flange portions 44, 46 are welded to the flange portions 34, 36 of pillar outer panel 60, the pillar inner panel 70 and the pillar outer panel 60 constitute the front pillar 17 having a closed section structure.

The side member outer panel 80 is disposed outward of the pillar outer panel 60 in the vehicle width direction. The side member outer panel 80 extends in the vehicle height direction along the front pillar 17 and is formed with metal such as a steel plate. Since the side member outer panel 80 has the same configuration as that of the side member outer panel 50 of the vehicle panel structure 10, the same reference numerals as those for respective portions of the side member outer panel 50 are given to respective portions of the side member outer panel 80 and description thereof will be appropriately omitted.

The fourth welded portion 14 is formed through spot welding that is performed on the three panels, which are the flange portions 54, 34, 44, in a state were the flange portion 54 of the side member outer panel 80, the flange portion 34 of the pillar outer panel 60, and the flange portion 44 of the pillar inner panel 70 are laid over each other while being arranged in this order from the outside of the vehicle (from vehicle upper side).

In the spot welding, an electric current is caused to flow to the panels laid over each other and the panels are bonded to each other with metal molten due to electrical resistance heat. A portion molten and coagulated due to the spot welding is called a nugget. The fourth welded portion 14 is formed with the nugget NA.

The fifth welded portion 15 is formed through welding that is performed on the flange portions 56, 36, 46 in a state where the flange portion 56 the side member outer panel 80, the flange portion 36 of the pillar outer panel 60, and the flange portion 46 of the pillar inner panel 70 are laid over each other while being arranged in this order from the outside of the vehicle (from outer side in vehicle width direction). As a welding method, for example, spot welding is used. However, other welding methods may also be used.

The thickness of the pillar outer panel 60 at the fourth welded portion 14 (that is, thickness of flange portion 34) is smaller than the thickness of the ridge portion 32A. The thickness of the pillar outer panel 60 gradually decreases toward the fourth welded portion 14 (flange portion 34) from the ridge portion 32A. That is the thickness of the first it portion 321 gradually (continuously) decreases toward the inner side in the vehicle width direction from the outer side in the vehicle width direction.

The thickness of a portion of the pillar outer panel 60 over an area from the ridge portion 32A to the flange portion 36 (including flange portion 36) is the same as the thickness of the ridge portion 32A and is constant. The thickness of the flange portion 34 is also constant. Therefore, the thickness of the flange portion 34 is smaller than the thickness of the ridge portions 32A, 32B, 32C, 32D.

The thickness of each of the pillar inner panel 70 and the side member outer panel 80 is constant over the entire portion. The thickness of the aide member outer panel 80 is smaller than die thickness of any of the pillar inner panel 70 and the flange portion 34 of the pillar outer panel 60. The thickness of the pillar inner panel 70 is smaller than the thickness of the ridge portion 32A of the pillar outer panel 60. For example, the thickness of the pillar inner panel 70 is the same as that of the flange portion 34 of the pillar outer panel 60.

Effect of Vehicle Panel Structure 19

Next, the effect of the vehicle panel structure 19 will be described.

In the vehicle panel structure 19, as described above, the fourth welded portion 14 is formed through spot welding that is performed on the three panels, which are the flange portions 54, 34, 44, in a state were the flange portion 54 of the side member outer panel 80, the flange portion 34 of the pillar outer panel 60, and the flange portion 44 of the pillar inner panel 70 are laid over each other while being arranged in this order from the outside of the vehicle (from vehicle upper side).

Therefore, the flange portion 54 of the side member outer panel 80 constitutes an outermost panel of the fourth welded portion 14. The flange portions 54, 34, 44 constitute all of the panels of the fourth welded portion 14.

The thickness of the pillar outer panel 60 at the fourth welded portion 14 (thickness of flange portion 34) is smaller than the thickness of the ridge portions 32A, 32B, 32C, 32D.

Therefore, in the case of the vehicle panel structure 19 according to the present embodiment, the total thickness of all of the panels of the fourth welded portion 14 can be made small in comparison with a case where the thickness of the entire pillar outer panel 60 including the fourth welded portion 14 (flange portion 34) is made large to be equal to the thickness of the ridge portions 32A, 32B, 32C, 32D (fourth comparative example).

Accordingly, in the case of the vehicle panel structure 19 according to the present embodiment, it is possible to maintain the thickness ratio [(a+b+c)/a] of the total thickness (a+b+c) of all of the panels to the thickness a of the outermost panel of the fourth welded portion 14 at a low ratio in comparison with the fourth comparative example (refer to FIG. 4). Therefore, it is possible to suppress welding failure even in a case where the thickness of the outermost panel is made small.

In the case of the vehicle panel structure 19 according to the present embodiment, the thickness of the ridge portions 32A, 32B, 32C, 32D is large in comparison with a case where the thickness of the entire pillar outer panel 60 including the ridge portions 32A, 32B, 32C, 32D is made small to be equal to the thickness of the pillar outer panel 60 at the fourth welded portion 14 (flange portion 34) (fifth comparative example). Therefore in the case if the vehicle panel structure 19 according to the present embodiment, the ridge portions 32A, 32B, 32C, 32D are not likely to be deformed due to input from the outside of the vehicle at the time of vehicle collision and it is possible to maintain the strength against vehicle collision of the pillar outer panel 60 in comparison with the fifth comparative example. Particularly, since the thickness or the side, portions 32A, 32B, 32D that protrude toward the outside of the vehicle is large, the pillar outer panel 60 being deformed toward the inside of the vehicle can be suppressed.

As described above, with the vehicle panel structure 19 according to the present embodiment, it is possible to maintain the yield strength against vehicle collision of the pillar outer panel 60 while suppressing welding failure even in a case where the thickness of the outermost panel (side member outer panel 80) is made small.

In the case of the vehicle panel structure 19 according to the present embodiment, the thickness of the pillar outer panel 60 gradually decreases toward the fourth welded portion 14 (flange portion 34) from the ridge portion 32A as described above. Therefore, it is possible to suppress the stress concentrated on a portion of the pillar outer panel 60 at the time of vehicle collision in comparison with a configuration in which the thickness of the pillar outer panel 60 dramatically changes between the ridge portion 32A and the fourth welded portion 14 (flange portion 34) (third comparative example).

Modification Example of Vehicle Panel Structure 19

As described above, the fourth welded portion 14 in the vehicle panel structure 19 is formed through spot welding performed on three panels, which are the flange portions 54, 34, 44. However, the disclosure is not limited to this. For example, the welded portion may be a welded portion formed through spot welding performed on four or more panels.

In the vehicle panel structure 19, the thickness of the pillar outer panel 60 at the fourth welded portion 14 (thickness of flange portion 34) is smaller than the thickness of the ridge portions 32A, 32B, 32C, 32D. However, the disclosure is not limited to this as long as the thickness of the flange portion 34 is smaller than the thickness of at least one of the ridge portions 32A, 32B, 32D protruding toward the outside of the vehicle.

In the vehicle panel structure 19, the thickness of the pillar outer panel 60 gradually decreases toward the fourth welded portion 14 (flange portion 34) from the ridge portion 32A. However, the disclosure is not limited to this. For example, the thickness of the pillar outer panel 60 may decrease toward the fourth welded portion 14 (flange portion 34) from the ridge portion 32A in a stepwise manner (not continuously).

The disclosure is not limited to the above-described embodiment and various modifications, changes, and improvement can be made without departing from the gist of the disclosure.

What is claimed is:

1. A vehicle panel structure comprising:
   an outer panel constituting an outer plate of a roof side rail or an outer plate of a front pillar;
   a side member outer panel disposed outward of the outer panel in a vehicle width direction;
   an inner panel disposed inward of the outer panel in the vehicle width direction; and
   a first welded portion formed through spot welding that is performed on three or more panels including the inner panel, the side member outer panel, and the outer panel in a state where the inner panel, the side member outer panel, and the outer panel are laid over each other while being arranged in this order from an outside of a vehicle or in a state where the side member outer panel, the outer panel, and the inner panel are laid over each other while being arranged in this order from the outside of the vehicle, wherein:

the outer panel is provided with a ridge portion that is disposed outward of the first welded portion in the vehicle width direction and that protrudes toward the outside of the vehicle; and a thickness of the outer panel at the first welded portion is smaller than a thickness of the ridge portion.

2. The vehicle panel structure according to claim 1, wherein the thickness of the outer panel gradually decreases toward the first welded portion from the ridge portion.

3. The vehicle panel structure according to claim 1, further comprising a second welded portion formed through welding that is performed on the outer panel and a rail inner panel of the roof side rail in a state where the rail inner panel is laid over a lower surface of the outer panel, the lower surface being positioned outward of the first welded portion in the vehicle width direction.

4. The vehicle panel structure according to claim 1, wherein a rail inner panel of the roof side rail is welded at the first welded portion.

* * * * *

UNITED STATES PATENT AND TRADEMARK OFFICE
CERTIFICATE OF CORRECTION

PATENT NO. : 10,843,741 B2
APPLICATION NO. : 16/196753
DATED : November 24, 2020
INVENTOR(S) : Yoshiaki Nakamoto and Naohiko Ueno It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), inventor 1, city, delete "Nisshin" and insert --Nisshin-shi Aichi-ken--, therefor.

Item (72), inventor 2, city, delete "Nagoya" and insert --Nagoya-shi Aichi-ken--, therefor.

Item (73), assignee, city, delete "Toyota" and insert --Toyota-shi Aichi-ken--, therefor.

In the Specification

In Column 1, Line(s) 58, after "outer panel", delete ",".

In Column 2, Line(s) 53, after "according", delete ",".

In Column 2, Line(s) 60, after "aspect", delete ",".

In Column 2, Line(s) 60, delete "s" and insert --is--, therefor.

In Column 3, Line(s) 45, delete "vim" and insert --view--, therefor.

In Column 3, Line(s) 54, after "line", insert --VIII-VIII--, therefor.

In Column 5, Line(s) 7, delete "tout" and insert --front--, therefor.

In Column 5, Line(s) 18, delete "will" and insert --wall--, therefor.

In Column 5, Line(s) 65, delete "front rear" and insert --front-rear--, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,843,741 B2

In Column 6, Line(s) 64, delete "30" and insert --50--, therefor.

In Column 7, Line(s) 19, delete "ether" and insert --other--, therefor.

In Column 7, Line(s) 29, after "Here", insert --,--.

In Column 7, Line(s) 40, delete "thrilled" and insert --formed--, therefor.

In Column 9, Line(s) 20, after "Furthermore", insert --,--.

In Column 11, Line(s) 11, delete "die" and insert --the--, therefor.

In Column 11, Line(s) 61, after "Therefore", insert --,--.